(12) United States Patent  
Finnerty

(10) Patent No.: US 7,875,403 B2
(45) Date of Patent: *Jan. 25, 2011

(54) SOLID OXIDE FUEL CELL SYSTEM

(75) Inventor: Caine Finnerty, Buffalo, NY (US)

(73) Assignee: Nano CP, LLC, Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/620,046

(22) Filed: Nov. 17, 2009

(65) Prior Publication Data

US 2010/0068582 A1   Mar. 18, 2010

Related U.S. Application Data

(63) Continuation of application No. 10/939,185, filed on Sep. 9, 2004, now Pat. No. 7,629,069.

(51) Int. Cl.
*H01M 8/12* (2006.01)
*H01M 8/04* (2006.01)

(52) U.S. Cl. ........................... 429/466; 429/410
(58) Field of Classification Search ............ 429/26, 429/31, 32, 466, 410
See application file for complete search history.

(56) References Cited

U.S. PATENT DOCUMENTS

| 3,457,052 | A | * | 7/1969 | Carlson et al. ........... 428/633 |
| 3,718,506 | A | | 2/1973 | Fischer et al. |
| 4,374,184 | A | | 2/1983 | Somers et al. |
| 4,374,185 | A | | 2/1983 | Powers et al. |
| 4,640,875 | A | | 2/1987 | Makiel |
| 4,728,584 | A | | 3/1988 | Isenberg |
| 4,774,153 | A | | 9/1988 | Sterzel |
| 4,808,491 | A | | 2/1989 | Reichner |
| 5,045,169 | A | | 9/1991 | Feduska et al. |
| 5,103,871 | A | | 4/1992 | Misawa et al. |
| 5,273,837 | A | | 12/1993 | Aitken et al. |
| 5,273,839 | A | | 12/1993 | Ishihara et al. |
| 5,733,675 | A | * | 3/1998 | Dederer et al. ........... 429/19 |
| 5,931,658 | A | | 8/1999 | Sederquist et al. |
| 6,379,485 | B1 | | 4/2002 | Borglum |
| 6,428,920 | B1 | * | 8/2002 | Badding et al. ........... 429/30 |
| 6,492,050 | B1 | * | 12/2002 | Sammes ................. 429/31 |

(Continued)

FOREIGN PATENT DOCUMENTS

EP   0264688 A1   4/1988

(Continued)

OTHER PUBLICATIONS

Extended European Search Report mailed on Aug. 14, 2009, in connection with European Patent Application Serial No. 05 79 6661 (3 pages).

(Continued)

*Primary Examiner*—Gregg Cantelmo
(74) *Attorney, Agent, or Firm*—K&L Gates LLP

(57) ABSTRACT

The present invention provides a solid oxide fuel cell system, which comprises a central support means, a fixture means, a current collection means, a manifold, and at least one fuel cell means, wherein the fuel cell means and the current collection means are moveable in the direction parallel to the axis of the fuel cell means.

17 Claims, 22 Drawing Sheets

U.S. PATENT DOCUMENTS

| | | |
|---|---|---|
| 6,630,267 B2 | 10/2003 | Badding et al. |
| 7,629,069 B2 * | 12/2009 | Finnerty ...................... 429/31 |
| 2003/0054215 A1 | 3/2003 | Doshi et al. |
| 2004/0023101 A1 | 2/2004 | Jacobson et al. |
| 2004/0175605 A1 | 9/2004 | Eshraghi et al. |
| 2004/0197637 A1 | 10/2004 | Blum |
| 2005/0008916 A1 | 1/2005 | Okamoto et al. |
| 2005/0031923 A1 | 2/2005 | Kuroishi et al. |
| 2005/0147857 A1 | 7/2005 | Crumm et al. |
| 2005/0282060 A1 * | 12/2005 | DeFillippis et al. ........... 429/38 |

FOREIGN PATENT DOCUMENTS

| | | | |
|---|---|---|---|
| JP | 04-237965 | | 8/1992 |
| JP | 08287940 | A * | 11/1996 |
| JP | 2002289249 | A * | 10/2002 |
| RU | 2 129 323 | C1 | 4/1999 |
| WO | 99/17390 | | 4/1999 |
| WO | WO 9917390 | A1 * | 4/1999 |
| WO | 03/041190 | A2 | 5/2003 |

OTHER PUBLICATIONS

EG & G Services, Parsons, Inc., SAIC, Fuel Cell Handbook, 5$^{th}$ edition, 2000, pp. 8-1 to 8-24, US Department of Energy, USA.

* cited by examiner

SOLID OXIDE FUEL CELL SYSTEM

CROSS-REFERENCE TO RELATED APPLICATIONS

This application is a continuation of U.S. patent application Ser. No. 10/939,185, filed on Sep. 9, 2004, the entire disclosure of which is incorporated by reference herein.

BACKGROUND

A fuel cell is an electrical device which converts the energy potential of fuel to electricity through an electrochemical reaction. In general, a fuel cell comprises a pair of electrodes separated by an electrolyte. The electrolyte only allows the passage of certain types of ions. The selective passage of ions across the electrolyte results in a potential being generated between the two electrodes. This potential can be harnessed to do useful work, such as powering a motor vehicle or home electronics. This direct conversion process increases the efficiency of power generation by removing mechanical steps required by traditional power generating device, such as turbine plants. Additionally, the combination of higher efficiency and electrochemical processes results in an environment-friendly product.

A solid oxide fuel cell ("SOFC") is a device that is approximately 40% efficient in converting the energy potential of fuel to electricity through an electrochemical reaction. SOFC possesses three basic parts: an anode that produces electrons, a cathode that consumes electrons, and an electrolyte that conducts ions but prevents electrons from passing. Unlike many fuel cells, the SOFC is capable of running on multiple types of fuel (e.g., hydrogen, propane, and diesel) without a separate chemical reformer. Therefore, the SOFC system generates a larger amount of electricity per pound that competitive fuel cell systems, such as systems incorporating proton exchange membrane fuel cells.

There are two general structural types of SOFC, tubular cells and planar cells, in referring to the shape of their respective fuel cells which are shaped cylinders as or plates. Solid oxide fuel cells operate at relatively high temperatures, around 850-1000 degrees Centigrade. As a result of these high operating temperatures, the planar cells suffer from difficulties with sealing around the ceramic parts of the cell. Thus, there exists a need for an improved fuel cell system that generates low internal thermal stresses and accordingly has reduced sealing requirements.

SUMMARY OF THE INVENTION

The present invention provides a solid oxide fuel cell system, which comprises a central support means, a fixture means, a current collection means, and at least one fuel cell means, wherein the fuel cell means and the current collection means are moveable in the direction parallel to the axis of the fuel cell means.

In one aspect, the fuel cell means, e.g. fuel cell tubes, attaches rigidly to the current collection means, such as through a conductive material (e.g. conductive paste), and form an assembly that is removable as a single unit. In one embodiment, the fuel cell means mounts on features extending from the surface of the fixture means, e.g. injector pins (7), in a manner such that the gap between the fuel cell means and the features extending from the surface of the fixture means is sufficiently small to allow operation without a seal between the fuel cell means and the fixture means. In another embodiment, the fuel cell means is inserted into a cavity in the fixture means. The length of the electrolyte and cathode are circumferentially variable so as to create the exposure of anode for the purpose of facilitating current collection. The central support means of the fuel cell system may also function as a fuel reformer.

The fuel cell system may further comprise a manifold, such as a hemispherical dome shape manifold, a heat exchanging means, or an afterburner. The heat exchanging means may be bound or joined by some mechanical means to the central support means. The heat exchanging means and the central support means may also be manufactured or assembled as a single unit.

The present invention also provides a solid oxide fuel cell system comprising a central support tube, a fuel cell plate, a current collection plate, a manifold, and at least one fuel cell tube, wherein the at least one fuel cell tube and the current collection plates are free to move in the direction parallel to the axis of the fuel cell tubes.

The present invention further teaches a method of converting a fuel into electrical energy, comprising the step of introducing the fuel and other materials (e.g. air) into a solid oxide fuel cell system, wherein the solid oxide fuel cell system comprising a central support means, a fixture means, a current collection means, and at least one fuel cell means, wherein the at least one fuel cell means and the current collection means are free to move in the direction parallel to the axis of the fuel cell means.

Additional aspects of the present invention will be apparent in view of the description that follows.

BRIEF DESCRIPTION OF THE FIGURES

As shown in FIG. 12, the heat exchanger (9) and the central support tube (2) may be removed as an assembly from the stack (1) to facilitate maintenance or replacement.

DETAILED DESCRIPTION OF THE INVENTION

As used herein and in the appended claims, the singular forms "a," "an," and "the" include plural references unless the content clearly dictates otherwise. Thus, for example, reference to "a combustion catalyst" includes a plurality of such combustion catalysts, and reference to "the fuel cell tube" is a reference to one or more fuel cell tube and equivalents thereof known to those skilled in the art, and so forth. All publications, patent applications, patents, and other references mentioned herein are incorporated by reference in their entirety.

The present invention provides a fuel cell system, which comprises a central support tube, a fuel cell plate, a current collection plate, a plurality of fuel cell tubes, and optionally, a manifold, an insulation means, a heat exchanger, or an afterburner. In one embodiment, the design of the fuel cell system allows unrestricted expansion and contraction of the fuel cell tubes during the thermal cycles associated with starting and stopping the system, thereby reducing or eliminating thermal stresses that can cause premature failure of solid oxide fuel cells. In addition, the fuel cell system is designed in such a manner that the fuel cell tubes as well as a fuel reformer and a heat exchanger can be easily removed for maintenance or replacement.

Figure 1:
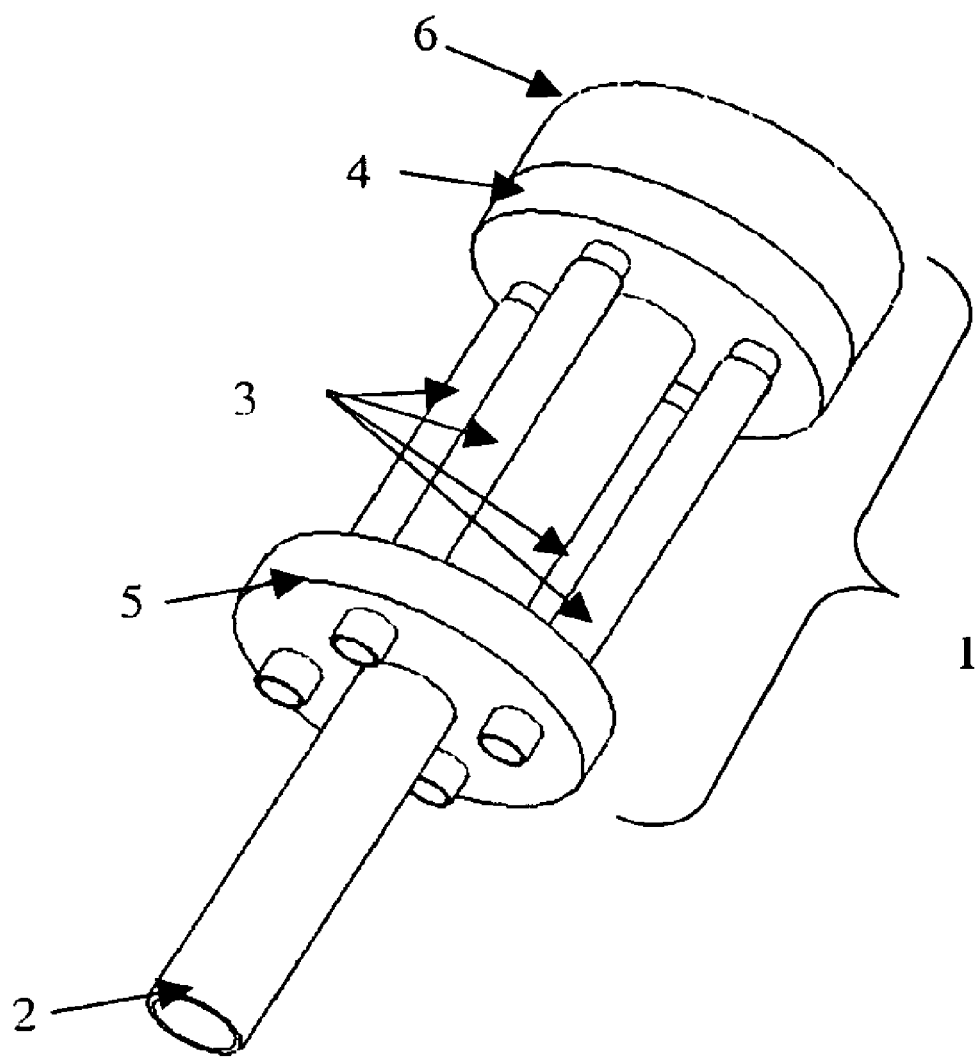
FIG. 1 depicts a representative fuel cell system. A central support tube (2) is inserted into a fuel cell stack (1) comprising of multiple fuel cells (3), a fuel cell plate (4), a current collection plate (5), and a manifold (6). The fuel cell plate (4) is affixed to the central support tube (2) by physical, mechanical, and/or chemical means, such as friction.

The central support tube (2), the fuel cell plate (4), and the current collection plate (5) may be made of any materials suitable for SOFC system, e.g. ceramic materials. The central support tube (2) may be connected with the fuel cell plate (4) through a number of mechanisms, such as by friction or by mechanical interactions. FIG. 1 discloses a tubular solid oxide fuel cell system design, wherein the central support tube (2) is attached to the fuel cell plate (4) by merely friction. The joint between the central support tube (2) and the fuel cell plate (4) may be a tight slip fit such that friction holds the fuel cell plate (4) in place on the central reformer tube.

The central support tube (2) may also function as an integral reformer to convert fuel (e.g. propane) to carbon monoxide and hydrogen suitable for reaction by the solid oxide fuel cells. In a preferred embodiment, the reformer is a partial oxidation reformer. For example, when propane is used as fuel, the partial oxidation reformer converts it into CO and $H_2$:

$$C_3H_8 + 1.5O_2 \rightarrow 3CO + 4H_2$$

Figure 2:
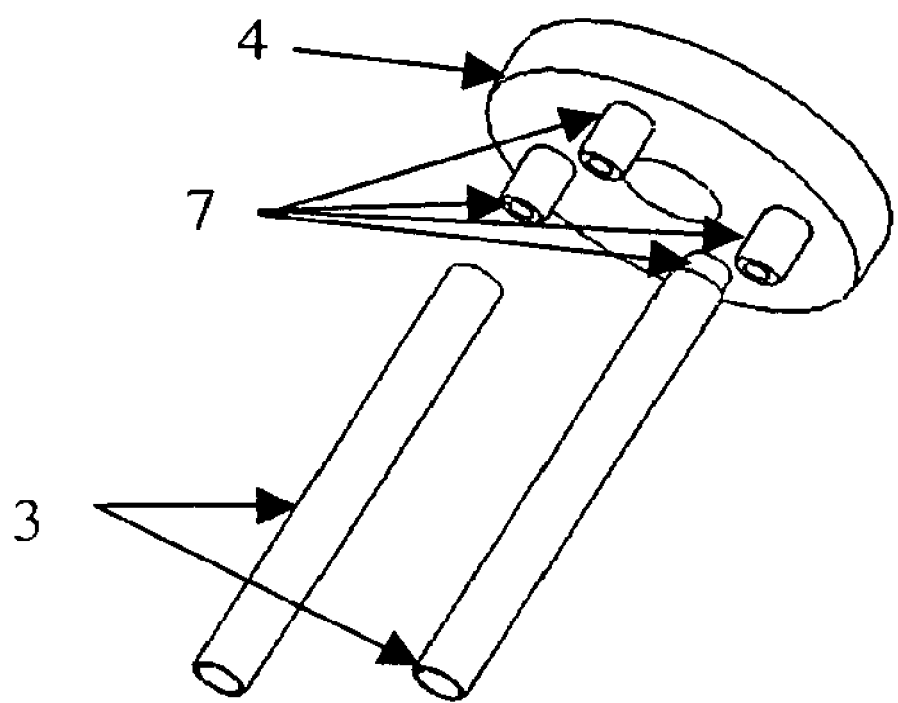
FIG. 2 shows a fuel cell plate with injector pins. The fuel cells (3) are inserted over injector pins (7) which are a feature of the fuel cell plate (4).
Figure 5:
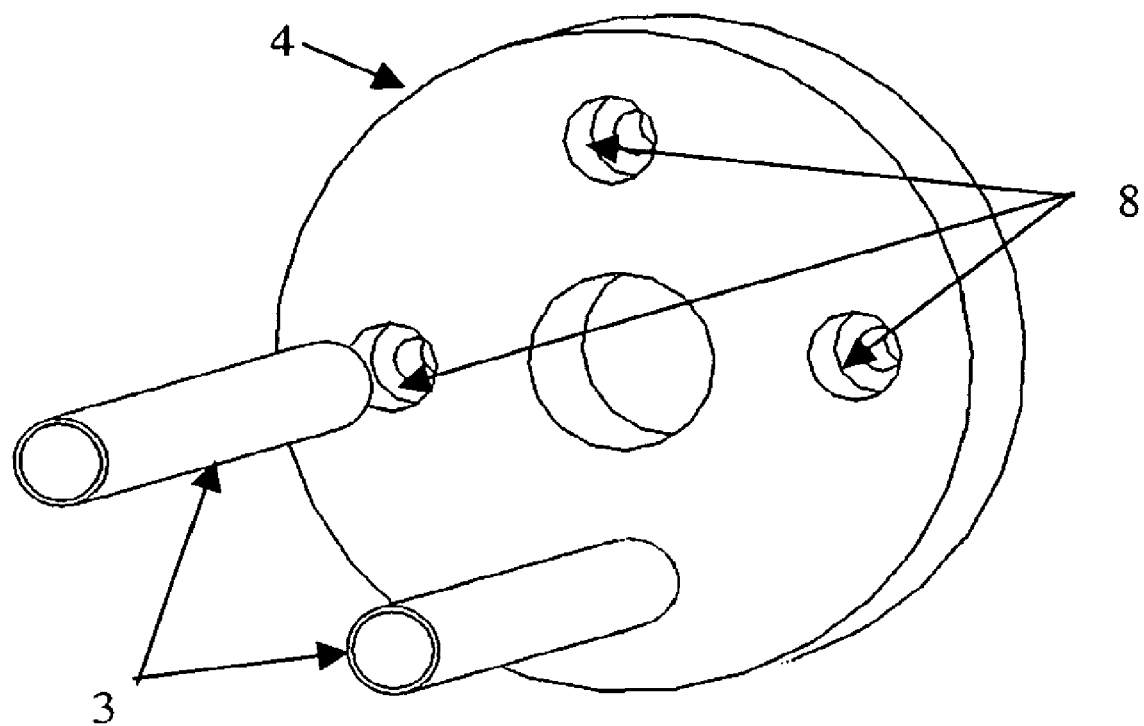
FIG. 5 shows an alternative fuel cell plate design. The fuel cell plate (4) is formed from an insulating material and the fuel cells (3) are inserted into cavities (8) in the fuel cell plate (4).

In one embodiment, the fuel cells (3) mount on features of the fuel cell plate (4) called injector pins (7) as shown in FIG. 2. The injector pins (7) may be formed as integral features of the fuel cell plate (4) or manufactured separately and assembled to the fuel cell plate (4). The diameter of the fuel cell tubes (3) may be slightly bigger than that of the injector pins (7) such that a narrow gap is formed when a fuel cell tube (3) is mounted on an injector pin (7). No separate seal is needed to prevent reformate (gaseous fuel) leakage because the pressure drops through the narrow gap between the injector pin (7) and the inside of the fuel cell (3) is much higher than the pressure drops through the fuel cell chamber and thus there is sufficient back pressure to minimize the leakage of reformate (gaseous fuel) from the inside of the fuel cell tubes (3) without the use of a separate seal. For example, a fuel cell (3) with a 2.8 mm diameter may be mounted to an injector pin (7) with a 2.5-2.7 mm diameter and the gap thus formed does not interfere with the operation of the fuel cell system. In another embodiment, the fuel cells (3) are mounted onto the fuel cell plate by inserting them into cavities (8) in the fuel cell plate (4), as shown in FIG. 5. The diameter of the cavities (8) may equal or be slightly smaller than that of the fuel cell tubes (3).

Figure 6:
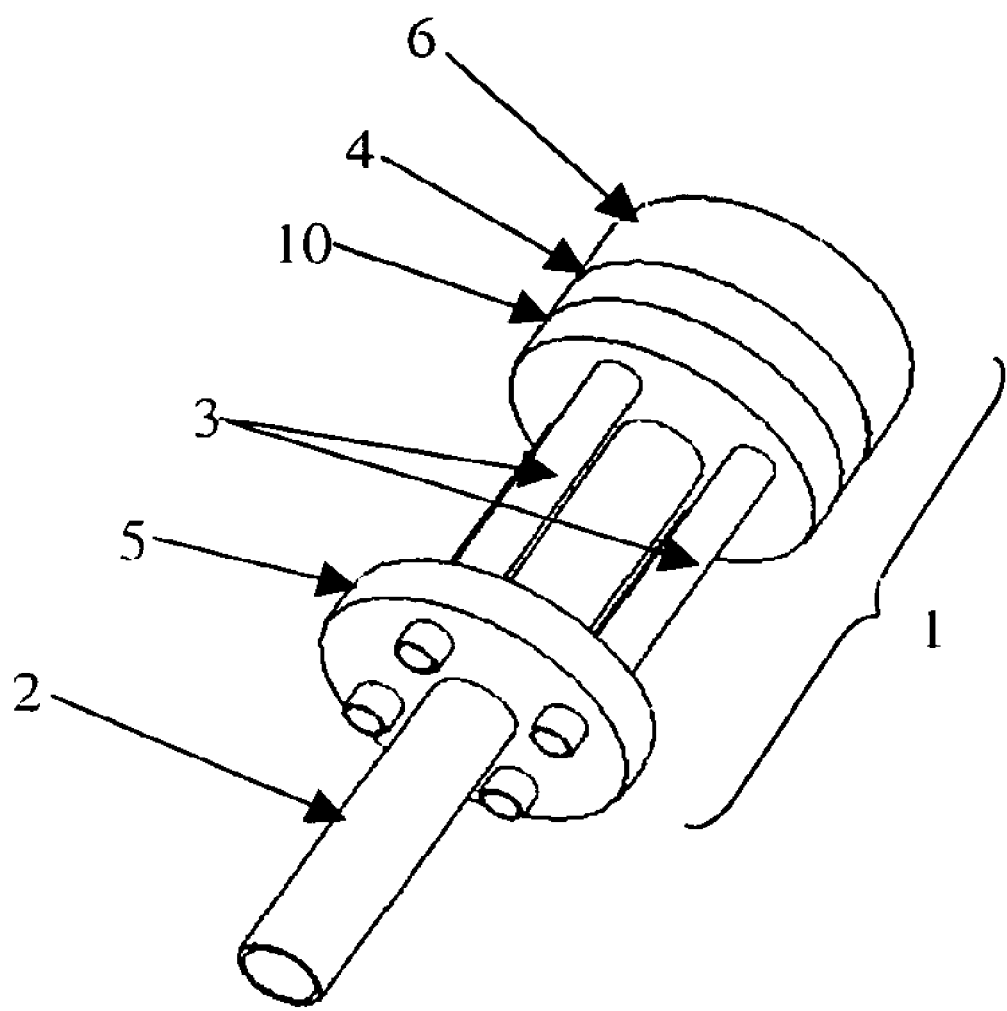
FIG. 6 illustrates a fuel cell system with an insulating plate adjacent to the fuel cell plate. A insulator plate (10), which is made of insulating material and located adjacent to the fuel cell plate (4) as shown in FIG. 6, is fabricated with openings equal to or slightly smaller than the fuel cells (3) to reduce gas leakage from fuel cells (3) at the joint with the fuel cell plate (4).

To increase further the pressure drops through the narrow gap, an insulation means, such as a plate (10) made of insulation material, may be installed in proximity to the fuel cell plate (4), as shown in FIG. 6. The term "in proximity" as used herein refers to a state wherein there is no gap between the adjacent components or even if there is a gap between two adjacent components, the gap is sufficiently small so as not to interfere with the function of the components, which, in the present case, is to create back pressure to minimize gas leakage. The insulation plate (10) may comprise a combustion catalyst which, in cases of fuel leakage, converts the leaked fuel to $CO_2$, and therefore, helps maintaining the non-reducing environment outside the channels of the fuel cell tubes (3).

Similarly, the narrow gap between the central support tube (2) and the fuel cell plate (4) and optionally, the insulation plate (10), prevents leakage of reformate through the gap between these two components without using a separate seal.

Figure 7:
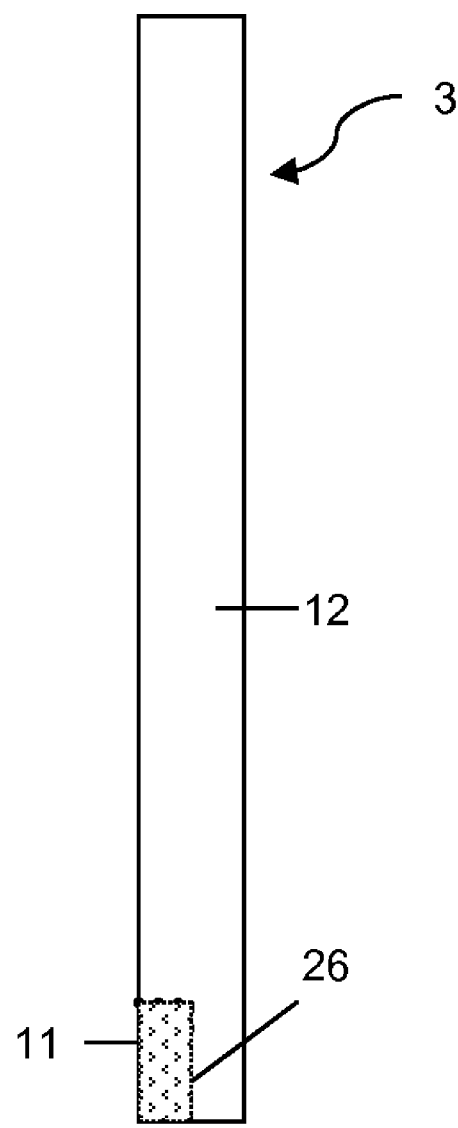
FIG. 7 depicts a side view of one embodiment of a fuel cell. In this embodiment, a fuel cell (3) comprises an anode (11), a cathode (12), and an electrolyte, wherein the anode (11) is partially exposed in a semi-circular pattern (26).
Figure 8:
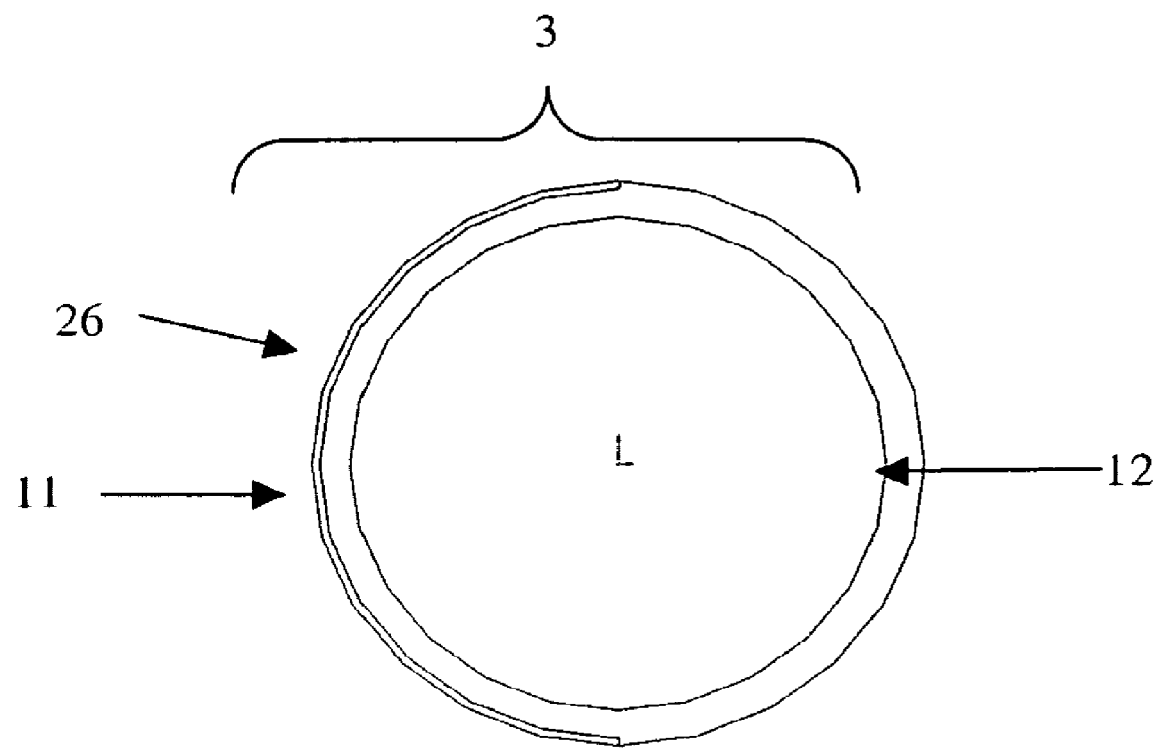
FIG. 8 is an end view of the fuel cell (3) of FIG. 7.
Figure 9:
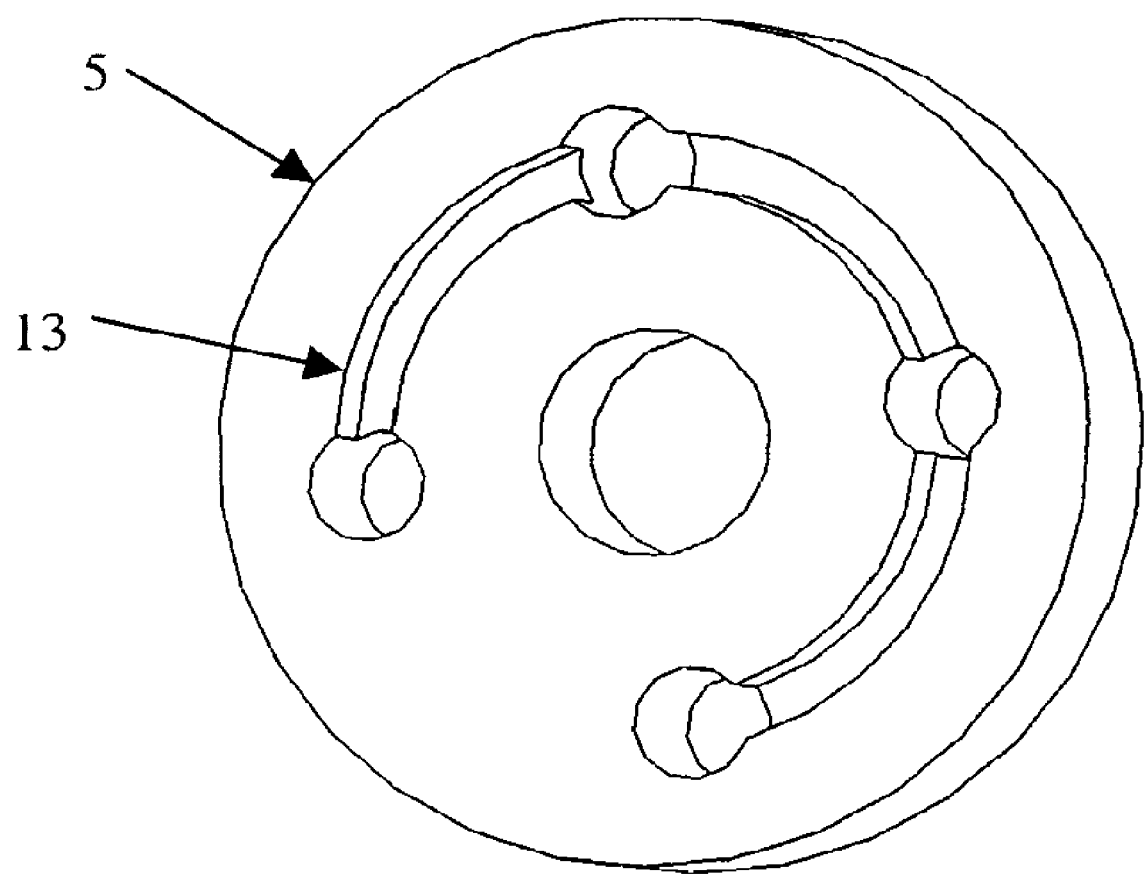
FIG. 9 shows a current collection plate with a current collection groove pattern (13).
Figure 10:
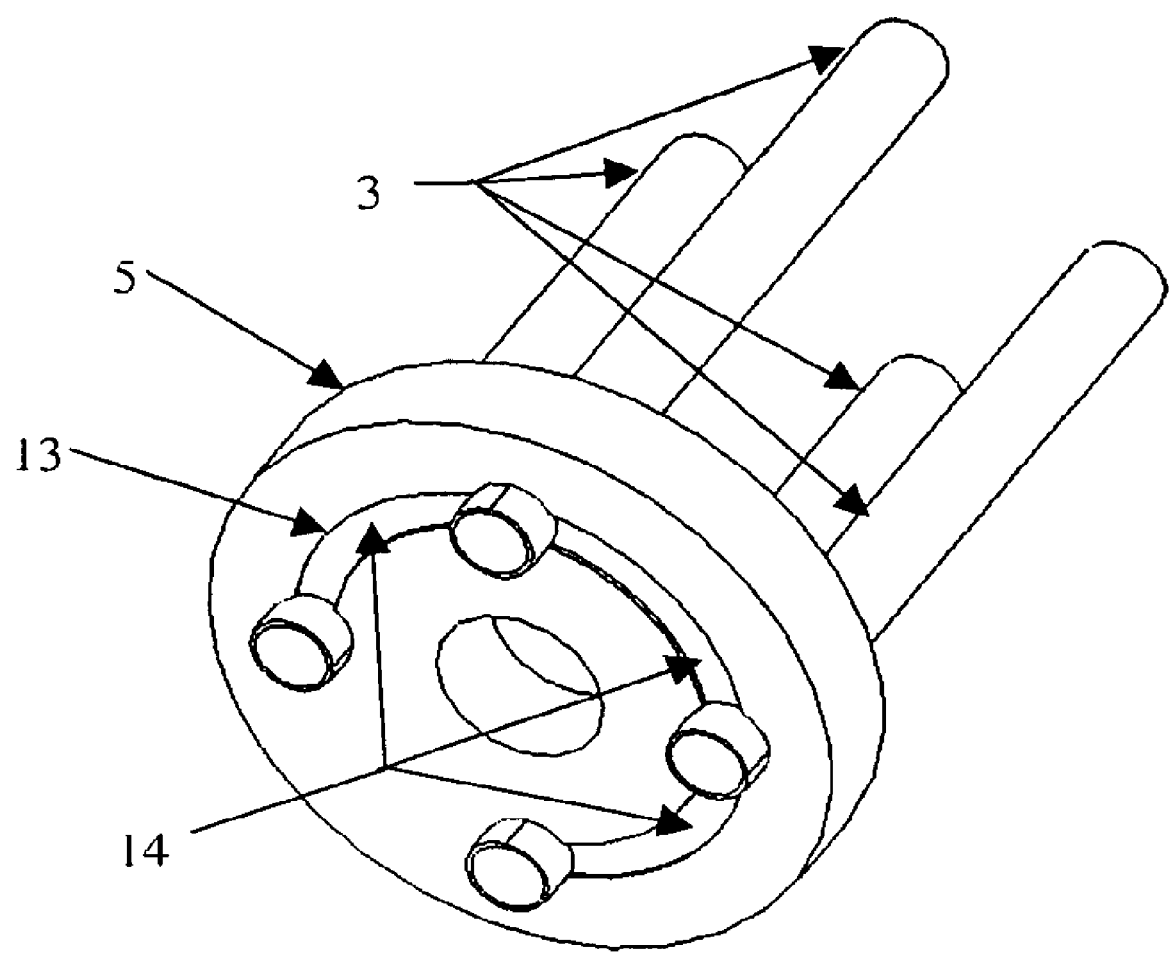
FIG. 10 illustrates the assembly of the current collection plate and four fuel cell tubes. The current collection groove pattern (13) may be filled with a conductive paste (14) following the insertion of the fuel cells (3).
Figure 19:
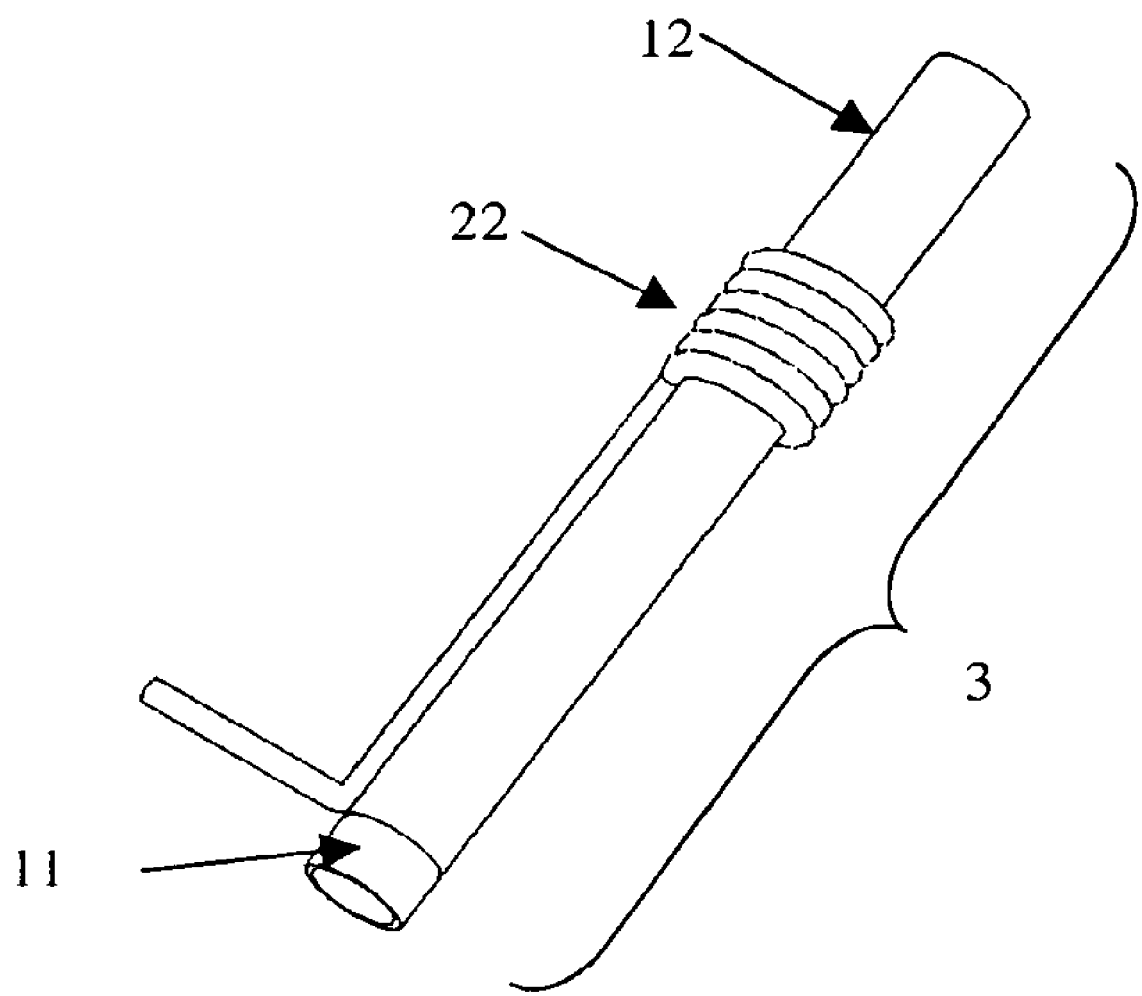
FIG. 19 depicts a fuel cell (3) with a cathode current collection system (22) that consists of non-insulated wire tightly wrapped around the cathode (12) of the fuel cell. The anode (11) of the fuel cell near the end of the cell is exposed to allow current collection after the fuel cell is inserted into the current collection plate.
Figure 20:
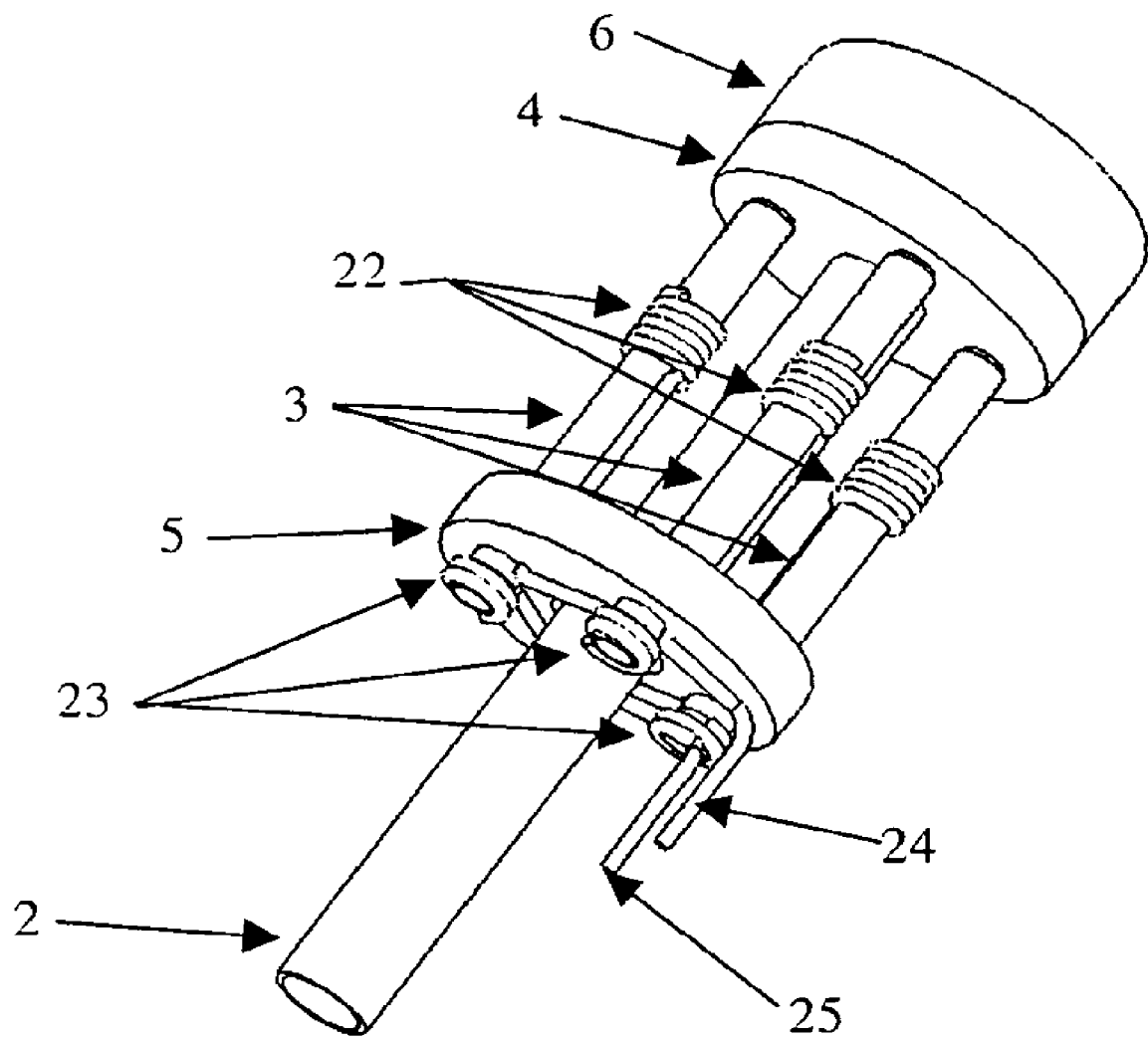
FIG. 20 illustrates a fuel cell system with wire wound current collection. The cathode current collection (22) is provided by a wire wound tightly around the fuel cells (3) and then threaded through a hole in the current collection plate (5). The wires are then wound around the exposed anode material at the end of adjacent fuel cells (3) to form the anode current collection (23). By connecting the anode and cathodes of adjacent fuel cells (3), the fuel cells (3) are wired electrically in series. The electrical power generated by the fuel cell is carried out of the system by the power leads (24) and (25) connected to the cathode and anode of the system respectively.
Figure 21:
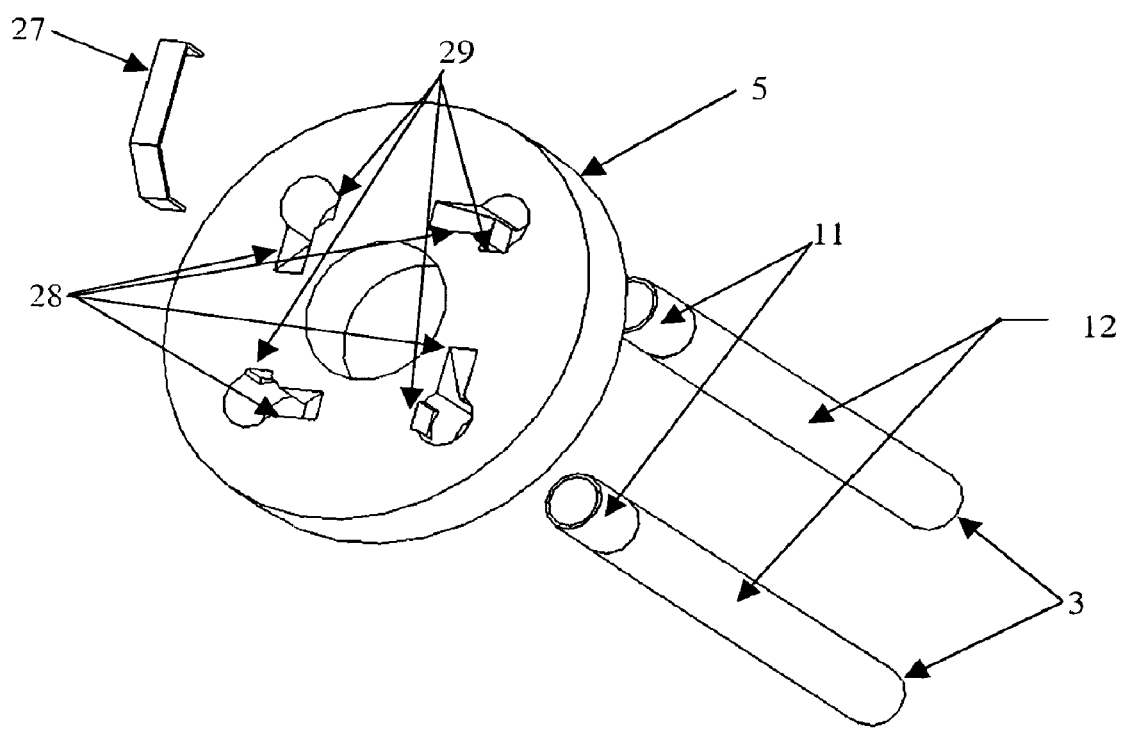
FIG. 21 displays a current collection scheme which employs conductive clips (27) to interconnect fuel cells (3) when the fuel cells (3) and conductive clips (27) are inserted into the current collection plate (5). To accommodate the requirement for one end of the conductive clip to contact the anode (11) and the opposite end of the conductive clip (27) to contact the cathode (12) for the adjacent fuel cells (3), an anode clip groove (29) and a cathode clip groove (28) are provided adjacent to the holes in the current collection plate (5) in which the fuel cells (3) mount. A portion of the anode (11) is not covered by the electrolyte and cathode (12) to facilitate contact with the conductive clip (27).
Figure 22:
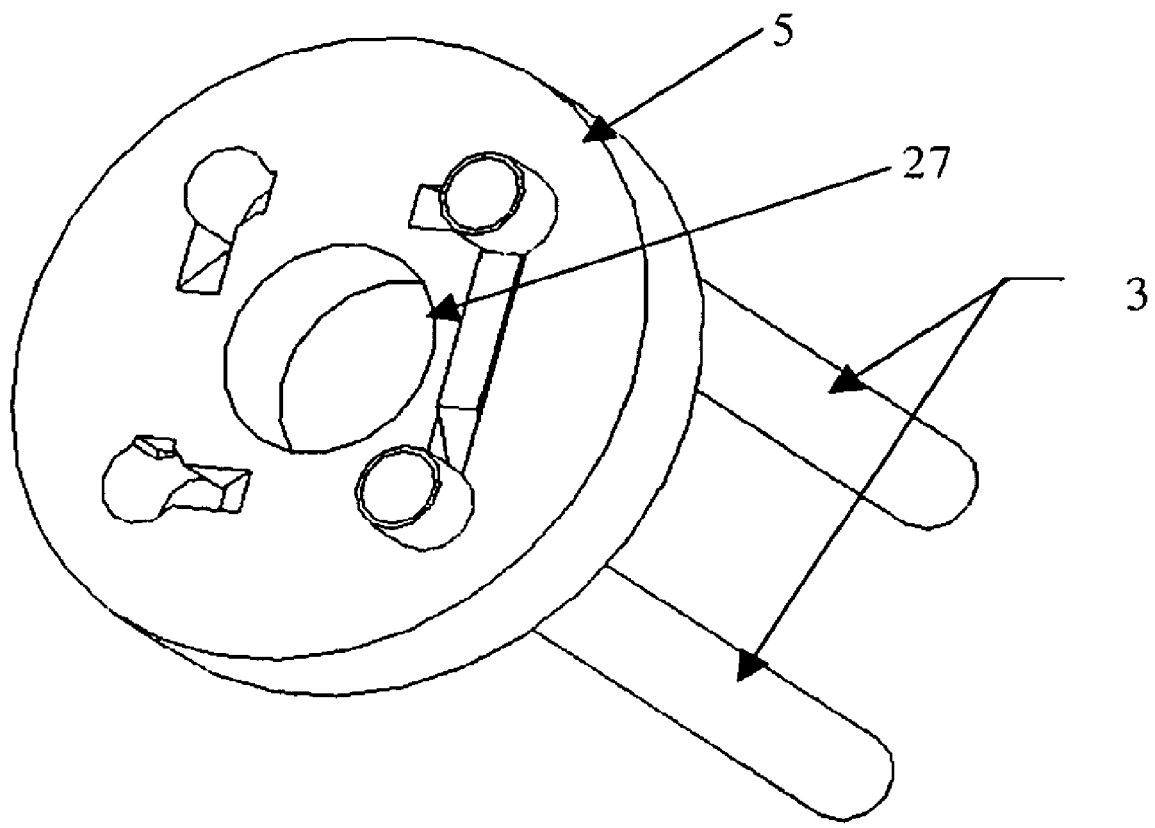
FIG. 22 shows the interconnection of the cathode of one fuel cell (3) with anode of the adjacent fuel cell (3) which are inserted in the current collection plate (5) and a conductive clip (27).
Figure 23:
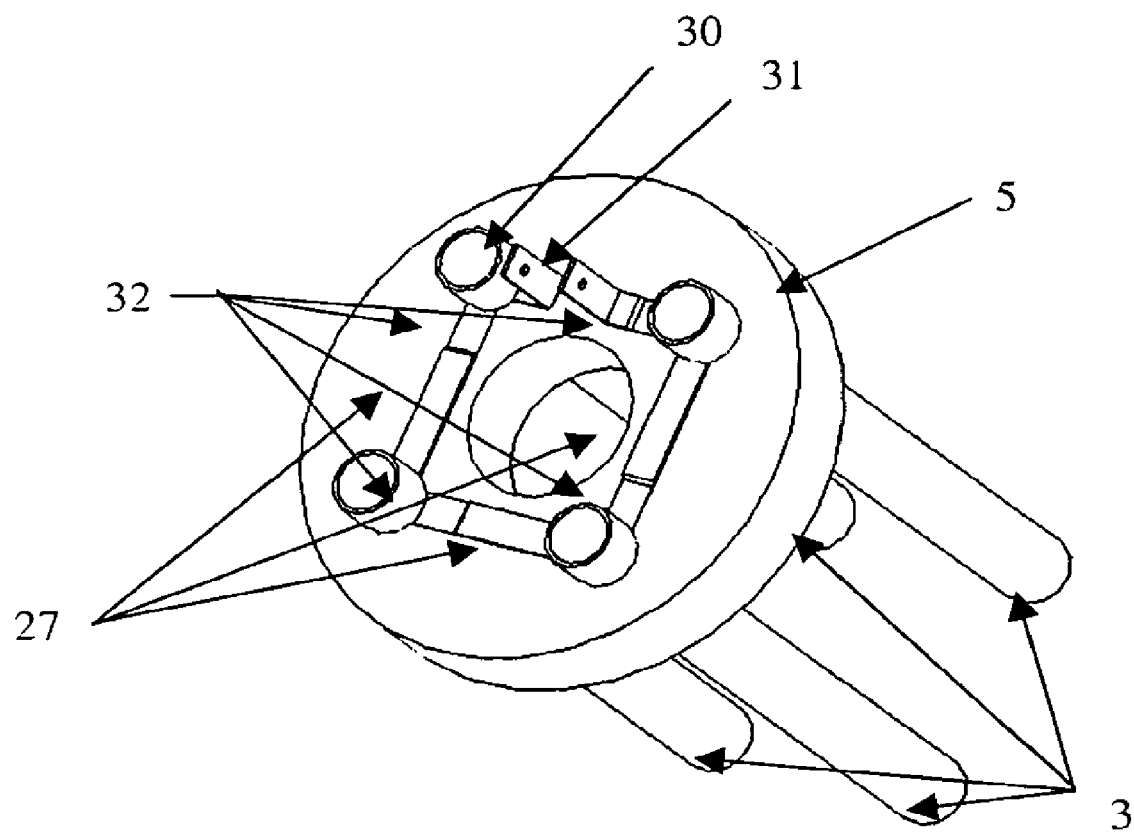
FIG. 23 depicts the complete assembly of a current collection system with the installation of four fuel cells (3) in the current collection plate (5) and the connective clips (27). An anode power clip (30) and cathode power clip (31) are installed in the respective anode clip groove and cathode clip groove. Ceramic filler (32) is installed in the cathode clip groove to prevent the connective clips (27) and the cathode power clip (31) from moving which could lead to an open circuit or a short circuit.

The fuel cells (3) are connected to the current collection plate (5) as shown in FIG. 1. In one embodiment, each cell is electrically connected to the current collection plate (5) by a current collection system which interconnects the fuel cells (3) with the appropriate combinations of parallel and series connections to produce the desired output voltage. A number of mechanisms may be employed to facilitate current collection. In one embodiment, the fuel cell tube (3) is fabricated in such a manner that the cathode and anode are exposed in a specific pattern, as shown in FIGS. 7-10 and 21-23, such that when the fuel cell (3) is inserted into the current collection plate (5) in the proper orientation, the pattern is appropriately positioned to allow the application of a conductive paste or clip to interconnect the anodes and cathodes of adjacent fuel cells (3) as desired. For example, a pattern of depressions may be incorporated into the fuel cell plate (4), as shown in FIG. 9, to facilitate the application of the conductive paste to interconnect the fuel cells (3) as shown in FIG. 10. The fuel cells (3) may be fabricated to include features such a local flats, protrusions, or grooves which align with corresponding features in the current collection plate (5) to insure the proper orientation of the fuel cell cathode and anode patterns with the current collection plate (5). Alternatively, a fuel cell (3) may be manufactured such that the anode (11) is partially exposed in a semi-circular pattern (26), as shown in FIGS. 7-8. Conductive clips (27) are used to interconnect fuel cells (3) when the fuel cells (3) and the conductive clips (27) are inserted into the current collection plate (5), as shown in FIG. 21-23. To accommodate the requirement for one end of the conductive clip (27) to contact the anode (11) and the opposite end of the conductive clip (27) to contact the cathode (12) for the adjacent fuel cells (3), an anode clip groove (29) and a cathode clip groove (28) are provided adjacent to the holes in the current collection plate (5) in which the fuel cells (3) mount. Ceramic filler (32) is installed in the cathode clip groove to prevent the connective clips (27) and the cathode power clip (31) from moving which could lead to an open circuit or a short circuit (FIG. 23). The current collection from the fuel cell tubes (3) may be accomplished through the use of wire (e.g. silver wire) or other suitable means to interconnect the anodes and cathodes of the individual fuel cells (3). FIGS. 19-20 discloses another current collection scheme, wherein the cathode current collection (22) is provided by a wire wound tightly around the fuel cells (3) and then threaded through a hole in the current collection plate (5). The anode (11) of the fuel cell (3) near the end of the cell is exposed to allow current collection after the fuel cell (3) is inserted into the current collection plate. The wires are then wound around the exposed anode material at the end of adjacent fuel cells (3) to form the anode current collection (23). By connecting the anode and cathodes of adjacent fuel cells (3), the fuel cells (3) are wired electrically in series. The electrical power generated by the fuel cell (3) is carried out of the system by the power leads (24) and (25) connected to the cathode (12) and anode (11) of the system respectively.

In one embodiment, the current collection plate (5) is a slip fit over the central support tube (2) and moveable along the direction parallel to the axis of the fuel cell tubes (3). The term "moveable" as used herein refers to the changing of relative position between the two subjects, such as the current collection plate (5) and the central support tube (2). It also refers to the changing of relative position between a portion of one subject (e.g. the extending or retracting of a portion of a fuel cell tube (3) such as the anode (11) end of a fuel cell (3)) with another subjects (e.g. the central support tube (2)). The combination of the current collection plate (5) and the fuel cells (3) may slide along the central support tube (2). During the operation of the fuel cell system, the current collection plate/fuel cell assembly is expandable longitudinally as a result of the clearance between the central support tube (2) and the current collection plate (5). This freedom of movement minimizes longitudinal compressive forces being applied to the fuel cells (3).

Figure 3:
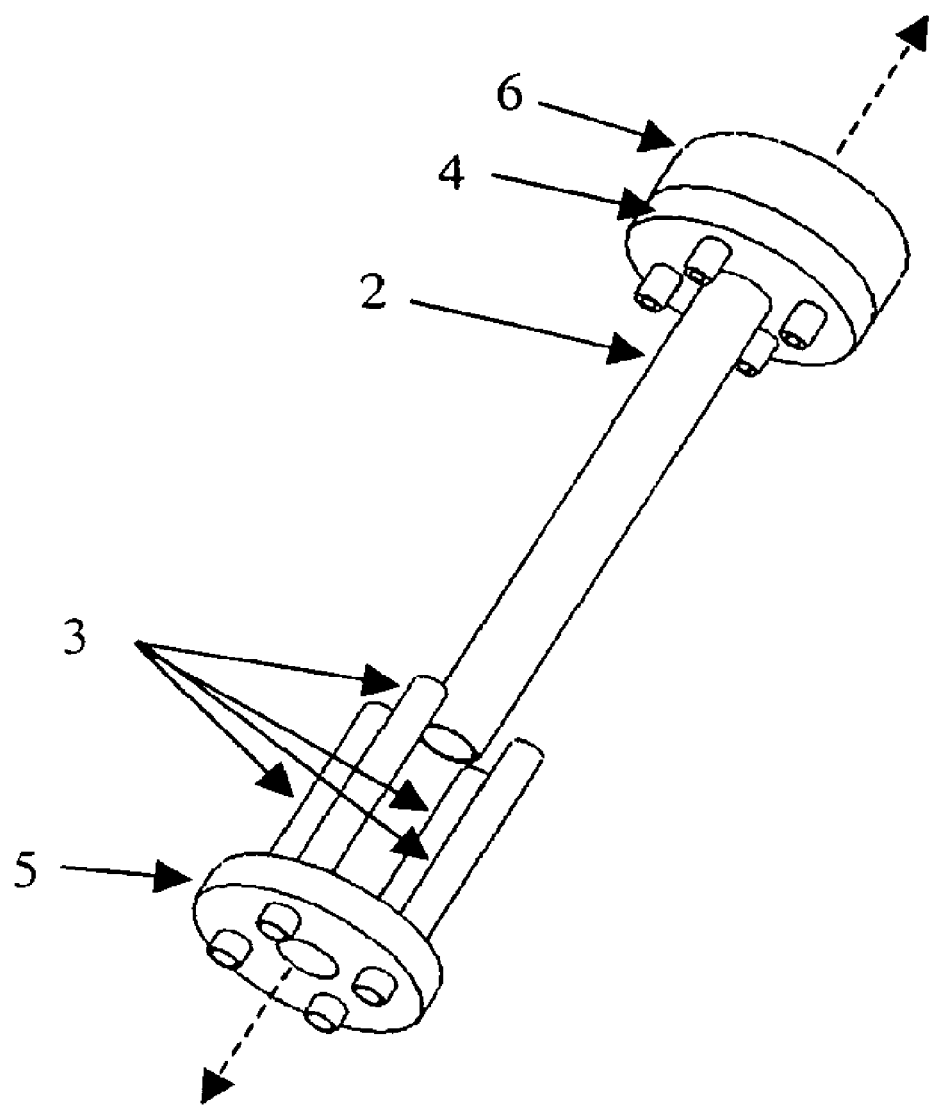
FIG. 3 illustrates a fuel cell system with the fuel cells and the current collection plate assembly removed. The assembly of the current collection plate (5) and the fuel cells (3) can be removed by sliding them off the central support tube (2).
Figure 4:
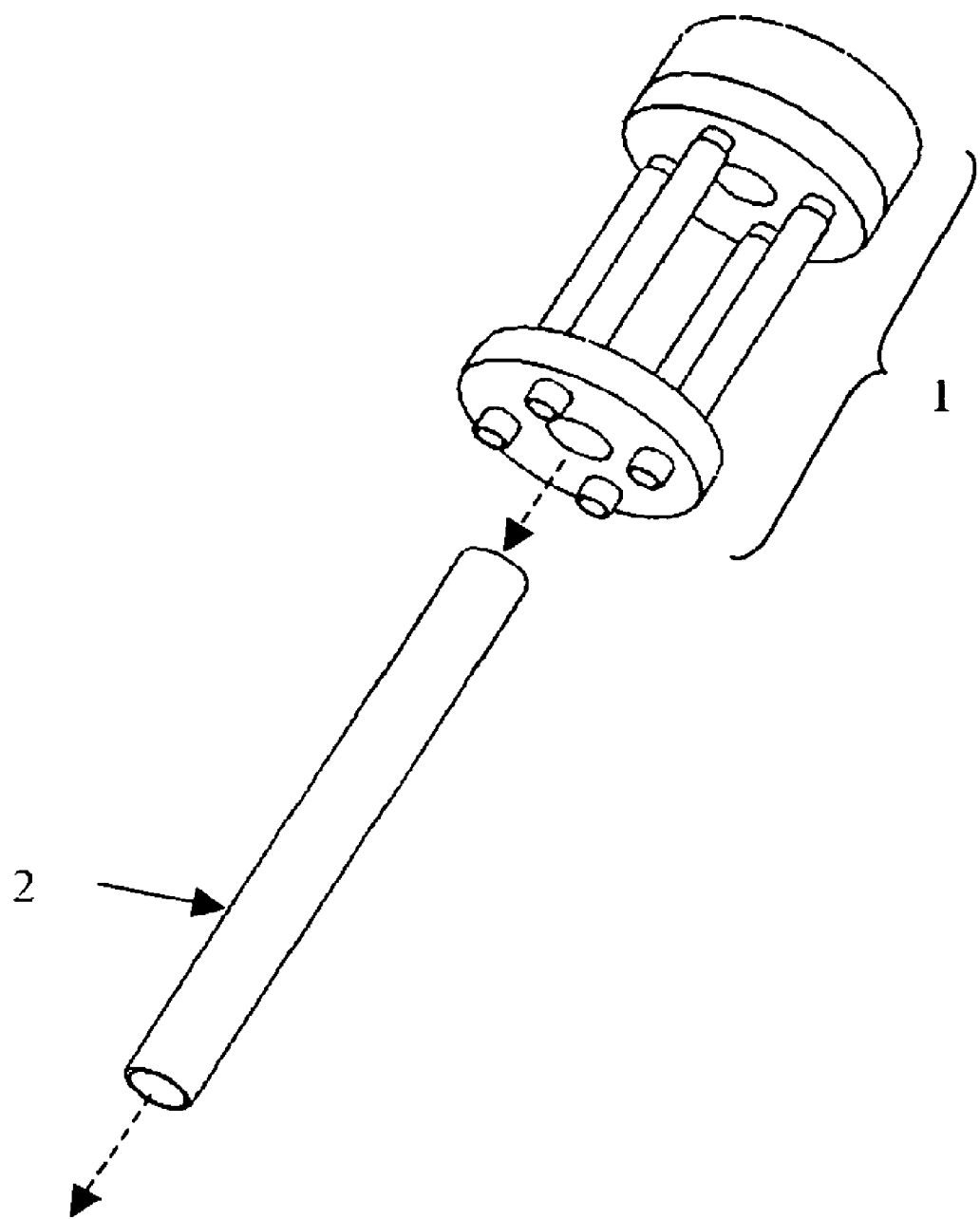
FIG. 4 depicts a fuel cell system with central support tube removed.

In one embodiment, the current collection and fuel cell assembly can easily be removed from the stack for maintenance and replacement since it simply slips over the central support tube (2) as shown in FIG. 3. In another embodiment, the central support tube (2) can be removed from stack because it is a tight slip fit (friction fit) into the fuel cell plate (4) as shown in FIG. 4.

An alternative design of the fuel cell plate (4) is shown in FIG. 5 wherein the plate, which is normally made of alumina or a similar ceramic material, is constructed using an insulation material, for example, 2-8 micron alumina fiber. In this design, the gap between the central support tube (2) and the fuel cell plate (4) can be larger because the depth of insertion of the central support tube (2) into the fuel cell plate (4) is greater, resulting in a large pressure drop between the inside of the fuel cell tube (3) and the area surrounding the fuel cell tube (3) and thus minimizing gas leakage.

In one embodiment, an insulator plate (10) is located in proximity to the fuel cell plate (4) as shown in FIG. 6. The holes through which the fuel cell tubes (3) pass in the insulator plate may be fabricated at a diameter equal to or slightly smaller than the individual fuel cell tubes (3) causing a tight fit between the fuel cells (3) and the insulator plate. The insulator plate (10) may be bound to the fuel cell plate (4) through chemical or physical means, such as alumina bonding agent or friction. The resulting fuel cell plate/insulator plate assembly produces an increased resistance to fuel leakage due to a large pressure drop between the inside of the fuel cell tube (3) and the area surrounding the fuel cell tube (3).

Figure 11:
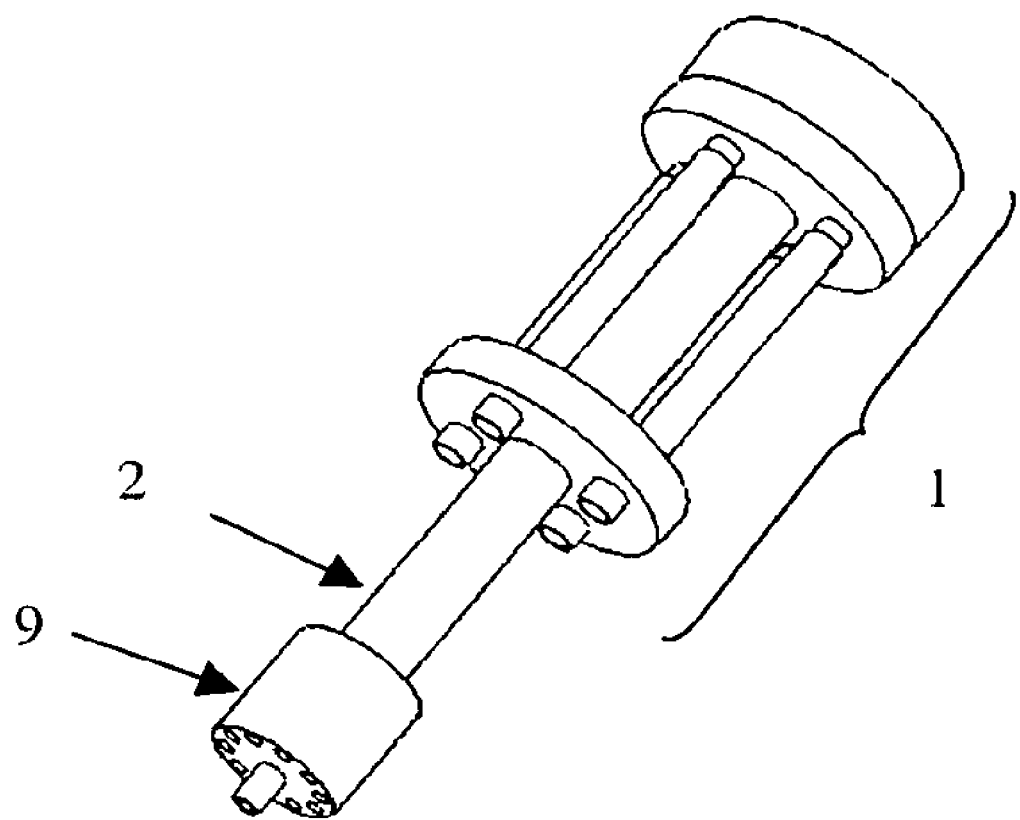
FIG. 11 depicts a fuel cell system with a heat exchanger at the end of the central support tube. The heat exchanger (9) preheats the fuel air mixture prior to entering the central support tube (2) using the heat extracted from the stack (1) exhaust gas.
Figure 12:
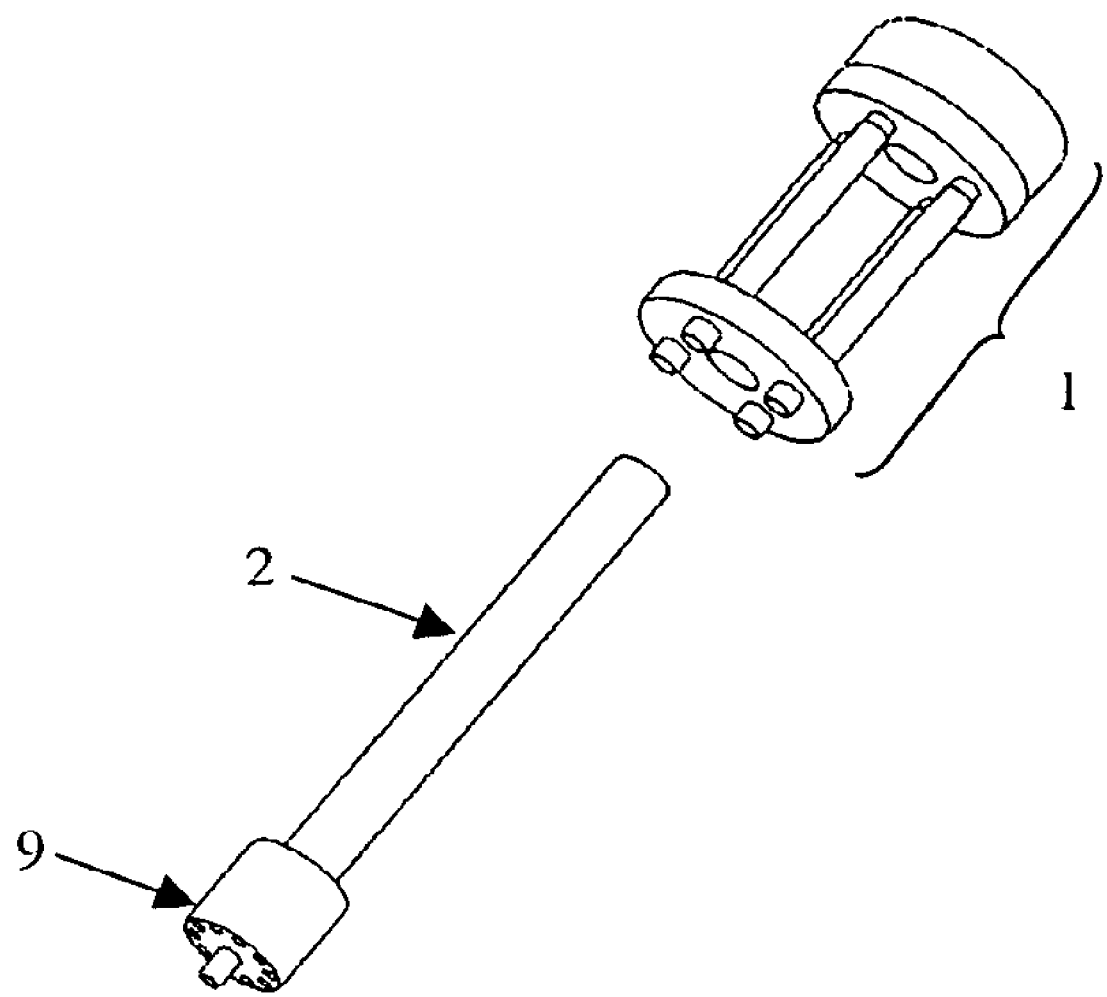
FIG. 12 shows a fuel cell system with the heat exchanger and the central support tube assembly removed. The heat exchanger (9) may be bound or otherwise attached to the central support tube (2) or manufactured as an integral part of the central support tube (2).

The central support tube, which may hold a chemical reformer in some applications, may also be attached to, or comprise, a heat exchanger or a afterburner as shown in FIGS. 10, and 16-18. This heat exchanger extracts heat from the fuel cell stack exhaust gas which it then uses to preheat the intake fuel/air mixture. The afterburner achieves the same effect by converting unconsumed fuel to heat using a combustion catalyst, such as $Pt/Al_2O_3$ particles, $PtRh/CeO_2/AlO_3$ pellet, and $Pt/\alpha\text{-}Al_2O_3$ foam monolith. The heat exchanger/afterburner and the central support tube (2) assembly can be removed from the stack for maintenance or replacement as shown in FIG. 11.

Figure 13:
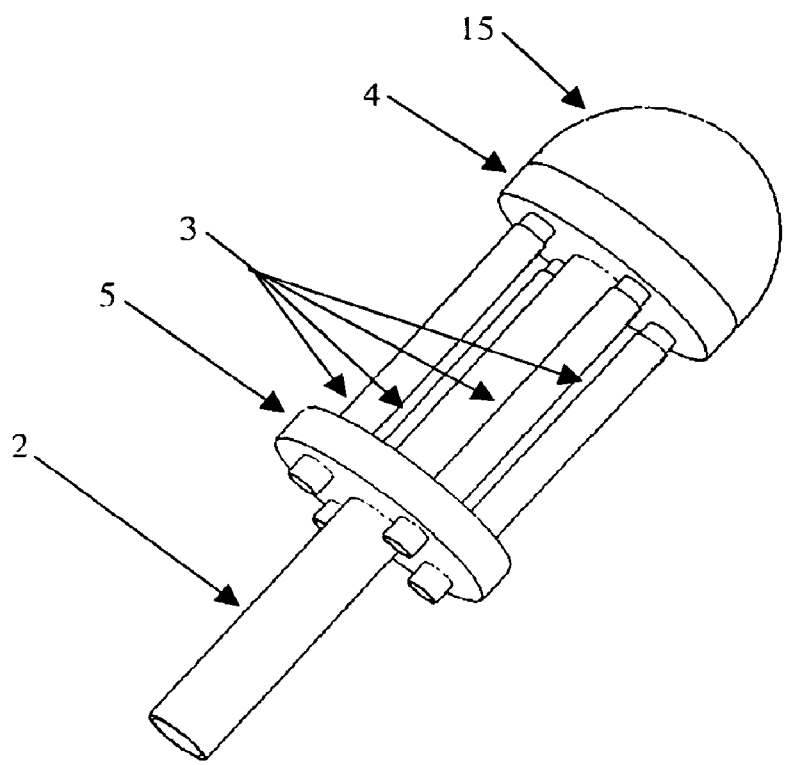
FIG. 13 illustrates a fuel cell system with a dome-shaped manifold. The manifold at the end of the stack is subject to thermal stresses during fuel cell operation. A dome-shaped manifold (15) reduces the thermal stresses on the manifold.
Figure 14:
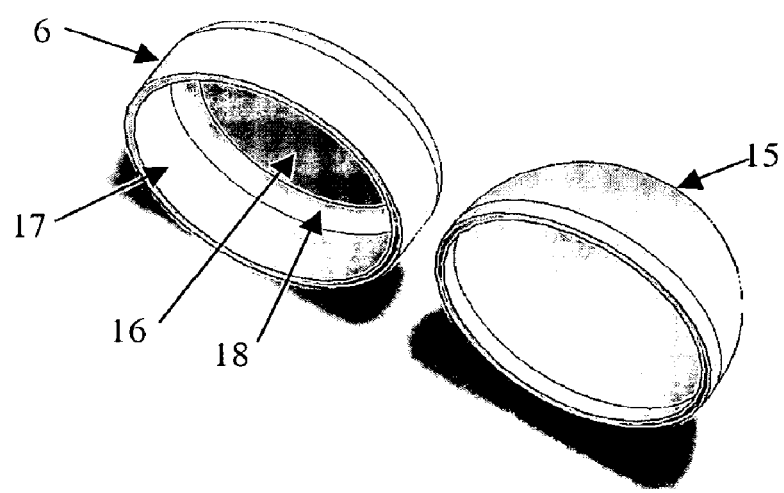
FIG. 14 shows a cylindrical and domed of manifold designs. A cylindrical manifold (6) as shown in FIG. 14 with a planar closure surface (16) experiences thermal expansion during the operation of a fuel cell, causing a stress at the intersection of the closure surface (16) and the cylindrical surrounding wall (17). A fillet (18) at the intersection of the closure surface (16) and the cylindrical surrounding wall (17) reduces the thermal-induced stresses.
Figure 15:
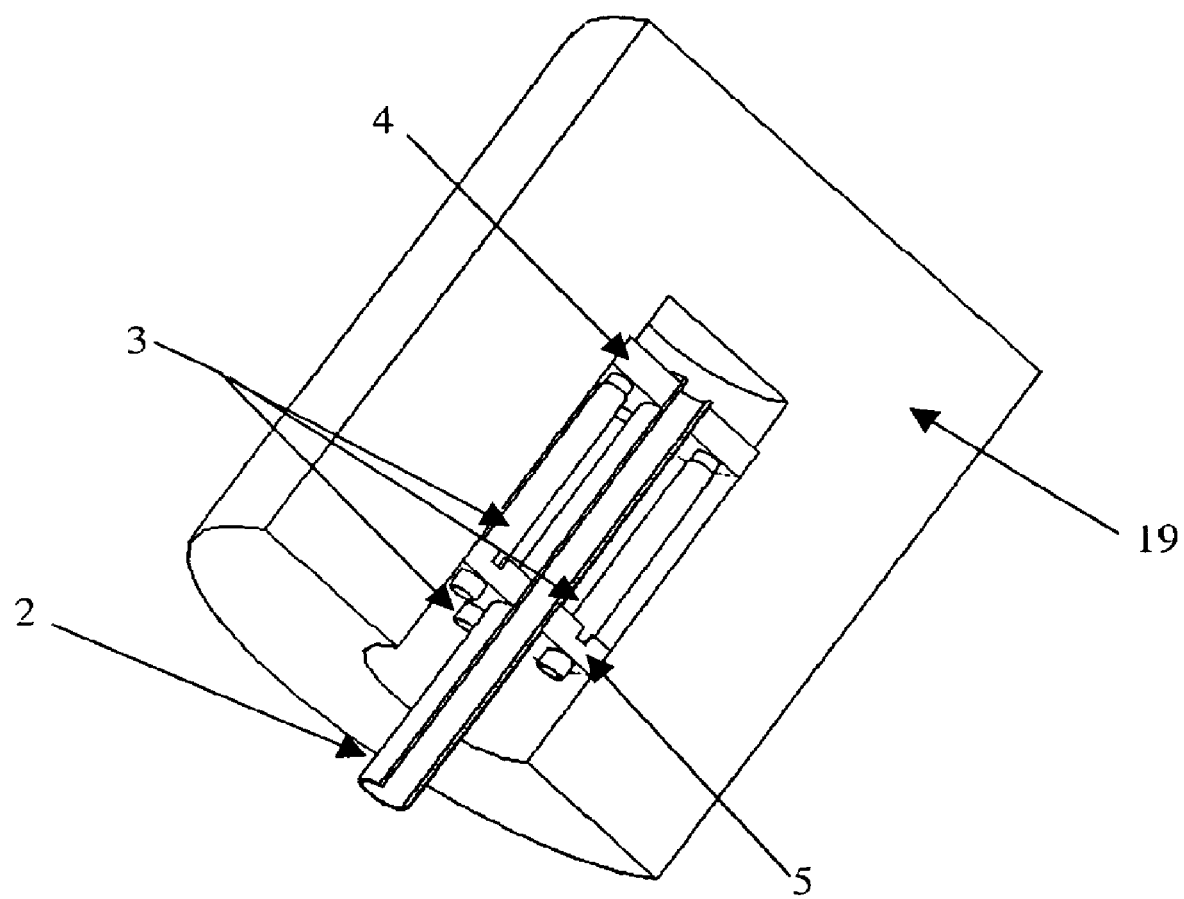
FIG. 15 illustrates a section view of a fuel cell system employing the stack insulation as the gas manifold. The fuel cell assembly is inserted into an insulation component (19) such that a void space (21) between the fuel cell plate (4) and the insulation component (19) is formed. The void space (21) serves as a gas manifold to provide a path for gases to pass from the central support tube (2) to the fuel cells (3).
Figure 16:
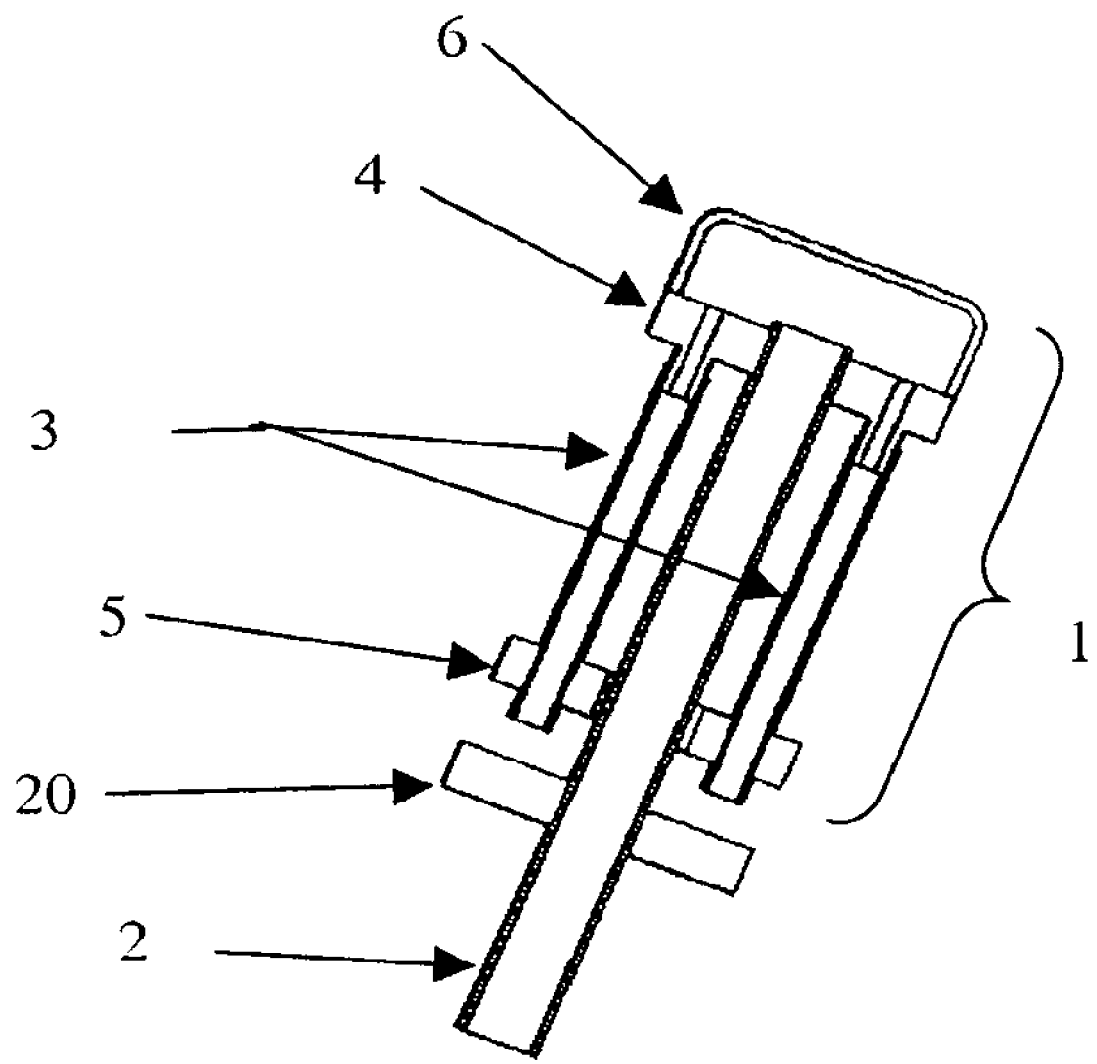
FIG. 16 depicts a section view of a fuel cell system. A central support tube (2) is inserted into a fuel cell stack (1) comprising of multiple fuel cells (3), a fuel cell plate (4), a current collection plate (5), and a manifold (6). An afterburner (20) is affixed to the central support tube (2) and combusts unconsumed fuel passing through the stack (1).
Figure 17:
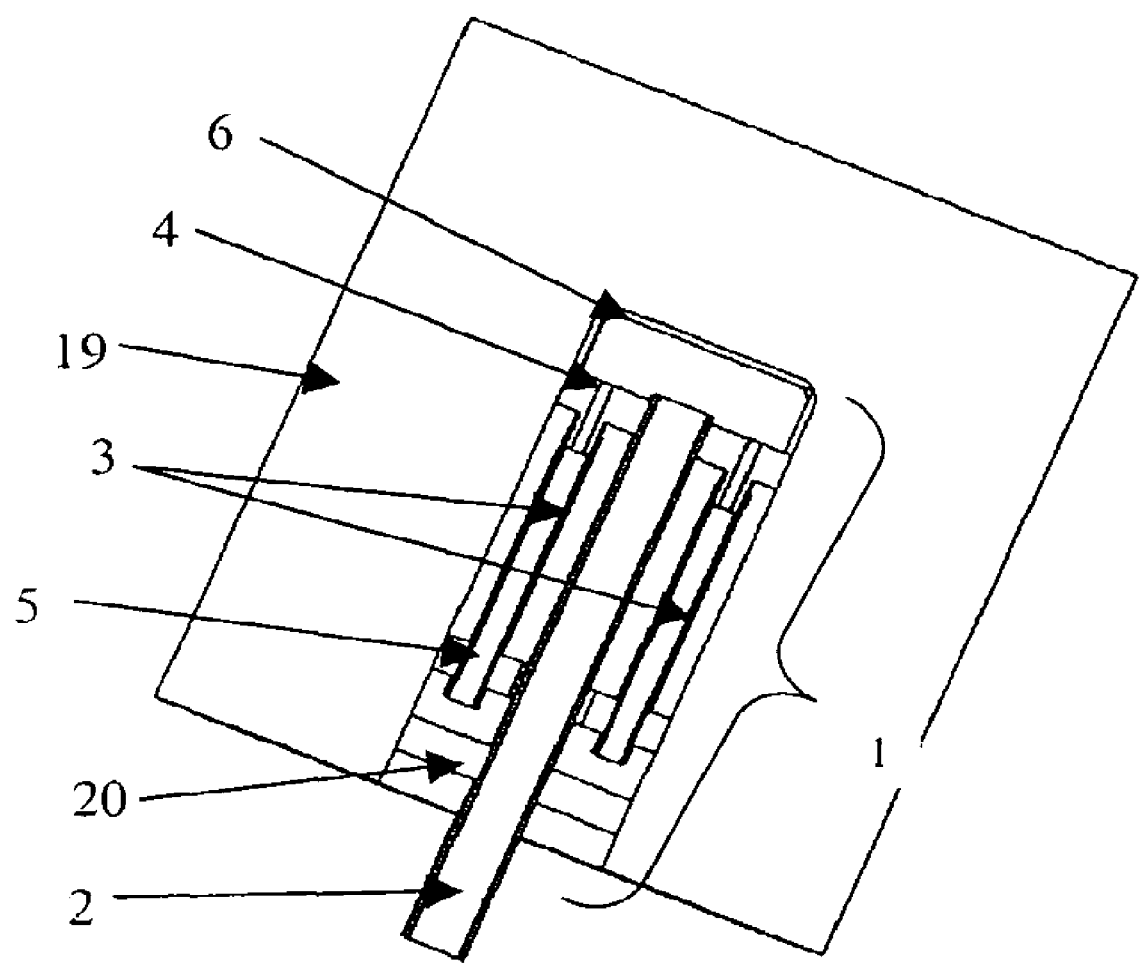
FIG. 17 illustrates a section view of a fuel cell system with an insulation component. The assembly is inserted into the insulation component (19) to prevent the heat associated with the operation of the fuel cells from leaving the assembly.
Figure 18:
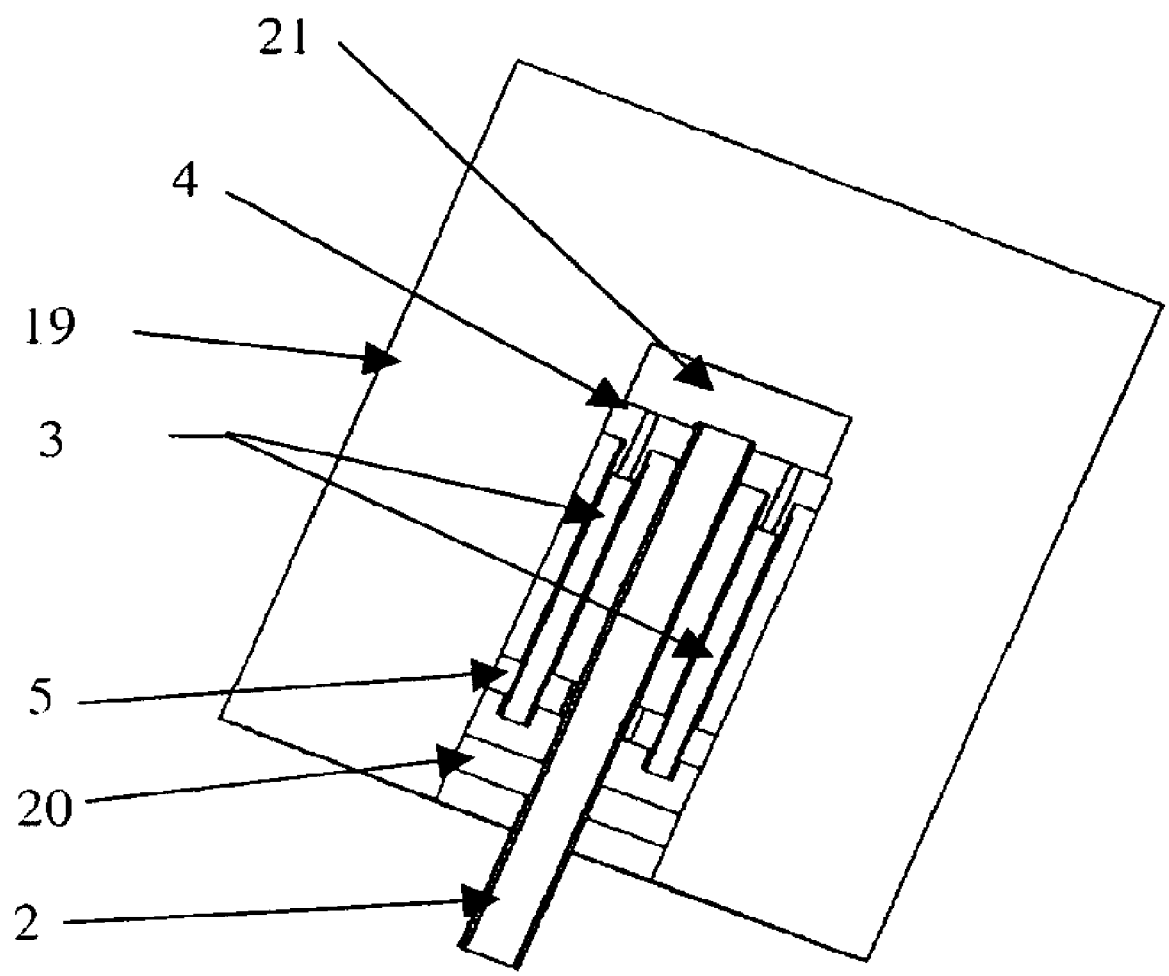
FIG. 18 shows a section view of a fuel cell system employing the stack insulation as the gas manifold. The assembly is inserted into an insulation component (19) such that a void space (21) between the fuel cell plate (4) and the insulation component (19) is formed. The void space (21) serves to provide a path for gases to pass from the central support tube (2) to the fuel cells (3).

The heating of the manifold during the operation of the fuel cells (3) creates thermally induced stresses. Installation of a manifold (15) which is shaped in the form of a hemispherical dome as shown in FIG. 13 reduces the stress concentrations within the manifold. As shown in FIG. 14, the manifold (6) with a planar closure surface (16) experiences stress concentration at the intersection of the closure surface (16) and the cylindrical side walls (17). A fillet (18) at the intersection reduces the thermal-induced stress. A hemispherical shaped manifold (16) further reduces the stress concentration thereby reducing the weight of the manifold. In one embodiment, the function of the manifold may be performed, as shown in FIG. 18, by binding the current collection plate (5) to an insulation component that is gas impermeable. This eliminates the separate manifold part and may reduce the overall cost of the system.

EXAMPLE

The following example illustrates the present invention, which is set forth to aid in the understanding of the invention, and should not be construed to limit in any way the scope of the invention as defined in the claims which follow thereafter.

The following example describes the construction of a fuel cell system with 36 fuel cells. The current collection plate, the fuel cell plate, and the manifold cap were made of alumina or macor and manufactured following a gel casting process as known in the art. The central support tube was constructed from an extrude alumina tube, which was tested by firing it to 1550° C. A dense Saffil fiber board was used to construct the insulation plate, whilst a Saffil felt was used for making gaskets.

The fuel cell plate, the current collection plate, the manifold cap, and the insulation plate were pre-fired to 950° C. to ensure that these parts were suitable for high temperature applications. Additional features, such as holes or grooves for thermocouples, current collection, or air flow, were added to the parts. Injector pins were made by cutting a pre-extruded alumina tube (O.D. 2.6 mm; I.D. 1.4 mm). The length of the injector pins was between 5-15 mm depending on the length of the fuel cell. The injector pins were then assembled and fixed onto the fuel cell plate by using an alumina bonding agent, Resbond 989 Hi-Purity Alumina Ceramic, and then cured at 600° C. for 2 hours to ensure that an appropriate seal was formed.

36 tubular fuel cells were prepared according to the method disclosed in U.S. patent application Ser. No. 60/526,398 entitled "Anode-Supported Solid Oxide Fuel Cell Using a Cermet Electrolyte." The fuel cells were then assembled into the current collection plate. Electrical connections were made to achieve the desired output voltage. For example, a 36 V output would require the 36 fuel cells to be wired in series, while an 18 V output would require that the 36 fuels be wired in series as 18 pairs. The electrical connections between the cells were made by using a combination of conductive metal plate/foam and/or conductive paste, such as silver and Ni/YSZ cermets. This assembly was then dried at 70° C. for 2 hours. A layer of alumina bonding agent was then added to the top of the current collection plate to seal the connection between the current collection plate and the fuel cells.

The reforming catalyst was added into the central supporting tube. The four segments of the catalyst were added sequentially to ensure that the POX catalysts were fitted first so that the reforming/combustion reaction flows exothermic to endothermic (segments 1 through 4). The catalyst segments were secured into position with an alumina-bonding agent (Resbond 989 Hi-Purity Alumina Ceramic). The central supporting tube was then cured at 70° C. for 4-6 hours.

The completed central support tube and the fuel cell plate were bonded together using Resbond 989 Hi-Purity Alumina Ceramic. This assembly was then cured for 2 hours at 70° C. Two Saffil felt gaskets were placed over the injector pins. The assembly containing the fuel cells and the current collection plate and the assembly containing the central support tube and the fuel cell plate were assembled together as shown in FIG. 3.

The manifold was attached to the fuel cell plate, and the insulation plate was positioned over the current collection plate. The afterburner catalyst was placed around the central support tube at a location which is 10 mm above the insulation plate. Saffil felt was then wrapped around the afterburner catalyst until the OD of the afterburner catalyst and the Saffil felt was equal to the OD of the current collection plate. The assembly, or the "stack," including thermocouples and insulating tubing for the positive and negative wires, was then cured for 4 hours at 70° C.

The stack was then slid into a tubular heat exchanger which has an ID slightly larger than the OD of the fuel cell plate and the current collect plate. The heat exchanger was located such that the holes on the internal wall of the heat exchanger were in line with the start of the active electrode on the fuel cell. This assembly was then fitted into a suitable insulation package, which was constructed such that the temperature of external interface of the fuel cell system is kept below 80° C. during the operation of the system.

The fuel cell system was tested under the following conditions. The system was started on an oxygen/propane fuel (2.4:1, respectively) at a flow rate 1-2.5 L/min. Ignition was accomplished using an electronic igniter located at the back of the afterburner. The system reached 700° C. in less than 10 minutes. At this point the oxygen/propane ratio was altered to between 1.8 and 2.2 depending on desired load of the system (full load=1.8; low load=2.2). The ratios were varied to maximize hydrogen production during high load demand and to balance the operating temperature of the stack, which increased to 850° C. under full load. The system produced 57 W at 835° C. when operated with an oxygen/propane ratio of 1.9. The system was then shut down on a reduced fuel flow rate (¼ of full flow), whilst maintaining an oxygen/propane ratio of 2.2.

While the foregoing invention has been described in some detail for purposes of clarity and understanding, it will be appreciated by one skilled in the art, from a reading of the disclosure, that various changes in form and detail can be made without departing from the true scope of the invention in the appended claims.

What is claimed is:

1. A solid oxide fuel cell system comprising:
   a plurality of tubular fuel cells;
   a fuel cell plate associated with a first end of each tubular fuel cell;
   a current collection plate associated with a second end of each tubular fuel cell;
   an insulator plate comprising a combustion catalyst between the fuel cell plate and the current collection plate;
   a current collection system in contact with the current collection plate, wherein the current collection system is in electrical connection with the plurality of tubular fuel cells and rigidly attaches the plurality of tubular fuel cells to the current collection plate such that the current collection plate, the current collection system, and the plurality of tubular fuel cells form a single removable assembly;
   a central support tube comprising a first end associated with the fuel cell plate; and
   at least one of a heat exchanger and an afterburner attached to the central support tube;
   wherein the single removable assembly comprising the current collection plate, the current collection system, and the plurality of tubular fuel cells is slidably attached to the central support tube.

2. A solid oxide fuel cell system comprising:
   a fuel cell plate;
   a plurality of tubular fuel cells associated with the fuel cell plate;
   a central support tube associated with the fuel cell plate, wherein the central support tube comprises a fuel reformer;
   at least one of a heat exchanger and an afterburner attached to the central support tube; and
   a current collection plate comprising a support for electrically connecting the plurality of tubular fuel cells, wherein the current collection plate and the tubular fuel cell form a single removable assembly which is slidably attached to the central support tube.

3. The solid oxide fuel cell system of claim 2, wherein the current collection plate is slip fit over the central support tube.

4. The solid oxide fuel cell system of claim 2, wherein the central support tube is friction fit into the fuel cell plate.

5. The solid oxide fuel cell system of claim 2, wherein the fuel cell plate comprises a plurality of injector pins.

6. The solid oxide fuel cell system of claim 5, wherein the tubular fuel cells are mounted on the injector pins.

7. The solid oxide fuel cell system of claim 6, wherein the tubular fuel cells are mounted on the injector pins without a seal.

8. The solid oxide fuel cell system of claim 7, wherein the injector pins are integral to the fuel cell plate.

9. The solid oxide fuel cell system of claim 2, wherein the fuel cell plate comprises a plurality of cavities and the tubular fuel cells are inserted into the cavities.

10. The solid oxide fuel cell system of claim 2, wherein the central support tube comprises a partial oxidation reforming catalyst.

11. The solid oxide fuel cell system of claim 2, wherein the fuel cell plate comprises an insulating material.

12. The solid oxide fuel cell system of claim 2, wherein the solid oxide fuel cell system comprises an afterburner attached to the central support tube and wherein the afterburner comprises a combustion catalyst.

13. The solid oxide fuel cell system of claim 2, further comprising an insulator plate between the fuel cell plate and the current collection plate.

14. The solid oxide fuel cell system of claim 13, wherein the insulator plate comprises a combustion catalyst.

15. The solid oxide fuel cell system of claim 2, wherein the current collection system comprises at least one of a conductive paste, a conductive clip, and a conductive wire.

16. The solid oxide fuel cell system of claim 15, wherein the current collection plate comprises a plurality of depressions and the conductive paste is applied to the depressions.

17. The solid oxide fuel cell system of claim 15, wherein the current collection system comprises a plurality of conductive clips inserted into the current collection plate.

* * * * *